US008600234B2

(12) United States Patent
Hirth et al.

(10) Patent No.: US 8,600,234 B2
(45) Date of Patent: Dec. 3, 2013

(54) METHOD AND APPARATUS FOR LINK SHARING AMONG MULTIPLE EPONS

(75) Inventors: Ryan E. Hirth, Windsor, CA (US); Edward W. Boyd, Petaluma, CA (US)

(73) Assignee: Broadcom Corporation, Irvine, CA (US)

( * ) Notice: Subject to any disclaimer, the term of this patent is extended or adjusted under 35 U.S.C. 154(b) by 470 days.

(21) Appl. No.: 12/749,285

(22) Filed: Mar. 29, 2010

(65) Prior Publication Data

US 2010/0254706 A1  Oct. 7, 2010

Related U.S. Application Data

(60) Provisional application No. 61/165,770, filed on Apr. 1, 2009.

(51) Int. Cl.
*H04J 14/00* (2006.01)

(52) U.S. Cl.
USPC ............... 398/70; 398/71; 398/72; 398/58; 398/66

(58) Field of Classification Search
USPC ............... 398/63, 66, 67, 68, 70, 71, 72, 58
See application file for complete search history.

(56) References Cited

U.S. PATENT DOCUMENTS

| | | | | |
|---|---|---|---|---|
| 7,839,872 | B2 * | 11/2010 | Diab et al. | 370/401 |
| 8,050,561 | B2 * | 11/2011 | Effenberger | 398/67 |
| 2005/0100036 | A1 | 5/2005 | Davis | |
| 2006/0171714 | A1 * | 8/2006 | Dove | 398/71 |
| 2007/0025352 | A1 | 2/2007 | Tanaka | |
| 2008/0037535 | A1 | 2/2008 | Yoon et al. | |
| 2008/0037990 | A1 | 2/2008 | Effenberger | |

FOREIGN PATENT DOCUMENTS

KR  10-2008-0107796   12/2008

OTHER PUBLICATIONS

International Search Report directed toward related International Patent Application No. PCT/US2010/029072, mailed Oct. 22, 2010, from the Korean Intellectual Property Office, Daejeon, Republic of Korea; 2 pages.
International Preliminary Report on Patentability with the Written Opinion directed toward related International Patent Application No. PCT/US2010/029072, mailed Oct. 4, 2011, from The International Bureau of WIPO; 5 pages.
European Search Report directed to related EP Application No. 10764838.8 from the European Patent Office, Rijswijk, The Netherlands dated May 10, 2013; 4 pages.

* cited by examiner

*Primary Examiner* — M. R. Sedighian
(74) *Attorney, Agent, or Firm* — Sterne, Kessler, Goldstein & Fox P.L.L.C.

(57) ABSTRACT

One embodiment of the present invention provides an optical line terminal (OLT) in an Ethernet passive optical network (EPON). The OLT includes a number of bi-direction optical transceivers. At least one bi-direction optical transceiver is coupled to an optical network unit (ONU) group that includes a number of ONUs. The OLT further includes a first downstream media access control (MAC) interface configured to provide a first downstream control signal and a splitter configured to split the first downstream control signal to a number of sub-signals. At least one sub-signal is configured to control downstream transmission of a corresponding bi-direction optical transceiver to a corresponding ONU-group.

26 Claims, 9 Drawing Sheets

METHOD AND APPARATUS FOR LINK SHARING AMONG MULTIPLE EPONS

RELATED APPLICATION

This application claims the benefit of U.S. Provisional Application No. 61/165,770, entitled "MULTIPLE EPONS SHARING COMMON DOWNSTREAM LINK," by inventors Ryan E. Hirth and Edward W. Boyd, filed 1 Apr. 2009.

BACKGROUND

1. Field

This disclosure is generally related to an Ethernet Passive Optical Network (EPON). More specifically, this disclosure is related to multiple EPONs sharing a common downstream link.

2. Related Arts

In order to keep pace with increasing Internet traffic, network operators have widely deployed optical fibers and optical transmission equipment, substantially increasing the capacity of backbone networks. A corresponding increase in access network capacity, however, has not matched this increase in backbone network capacity. Even with broadband solutions, such as digital subscriber line (DSL) and cable modem (CM), the limited bandwidth offered by current access networks still presents a severe bottleneck in delivering large bandwidth to end users.

Among different competing technologies, passive optical networks (PONs) are one of the best candidates for next-generation access networks. With the large bandwidth of optical fibers, PONs can accommodate broadband voice, data, and video traffic simultaneously. Such integrated service is difficult to provide with DSL or CM technology. Furthermore, PONs can be built with existing protocols, such as Ethernet and ATM, which facilitate interoperability between PONs and other network equipment.

Typically, PONs are used in the "first mile" of the network, which provides connectivity between the service provider's central offices and the premises of the customers. The "first mile" is generally a logical point-to-multipoint network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers. Note that other topologies, such as ring and mesh topologies, are also possible.

Transmissions within a PON are typically performed between an optical line terminal (OLT) and optical network units (ONUs). The OLT generally resides in the central office and couples the optical access network to a metro backbone, which can be an external network belonging to, for example, an Internet service provider (ISP) or a local exchange carrier. The ONU can reside in the residence of the customer and couples to the customer's own home network through a customer-premises equipment (CPE).

Figure 1A:
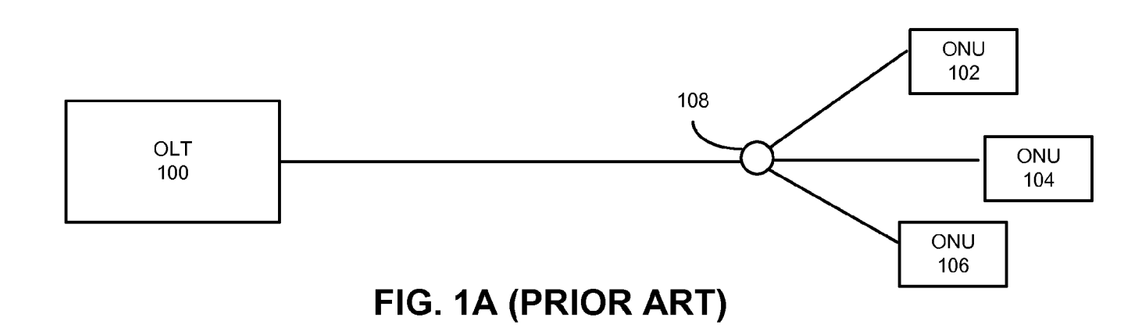
FIG. 1A illustrates a passive optical network including an OLT (located at a central office) and a number of ONUs (located at customers' premises) coupled through optical fibers and a passive optical splitter (prior art).

FIG. 1A illustrates a passive optical network including an OLT (located at a central office) and a number of ONUs (located at customers' premises) coupled through optical fibers and a passive optical splitter (prior art). A passive optical splitter 108 and optical fibers couple ONUs 102, 104, and 106 to an OLT 100. Although FIG. 1 illustrates a tree topology, a PON can also be based on other topologies, such as a logical ring or a logical bus. Note that, although in this disclosure many examples are based on EPONs, embodiments of the present invention are not limited to EPONs and can be applied to a variety of PONs, such as ATM PONs (APONs) and wavelength domain multiplexing (WDM) PONs.

Figure 1B:
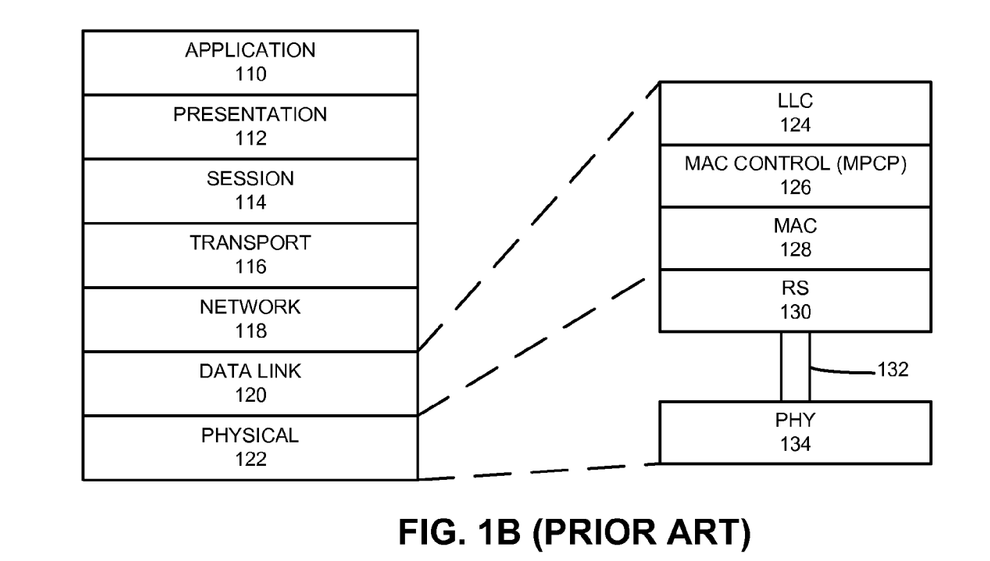
FIG. 1B presents a block diagram illustrating the layered structure of a conventional EPON (prior art).

FIG. 1B presents a block diagram illustrating the layered structure of a conventional EPON (prior art). The left half of FIG. 1B illustrates the layer structure of an Open System Interconnection (OSI) model including an application layer 110, a presentation layer 112, a session layer 114, a transport layer 116, a network layer 118, a data link layer 120, and a physical layer 122. The right half of FIG. 1B illustrates EPON elements residing in data link layer 120 and physical layer 122. EPON elements include a media access control (MAC) layer 128, a MAC control layer 126, a logic link control (LLC) layer 124, a reconciliation sublayer (RS) 130, medium interface 132, and physical layer device (PHY) 134.

In an EPON, communications can include downstream traffic and upstream traffic. In the following description, "downstream" refers to the direction from an OLT to one or more ONUs, and "upstream" refers to the direction from an ONU to the OLT. In the downstream direction, because of the broadcast nature of the 1×N passive optical coupler, data packets are broadcast by the OLT to all ONUs and are selectively extracted by their destination ONUs. Moreover, each ONU is assigned one or more Logical Link Identifiers (LLIDs), and a data packet transmitted by the OLT typically specifies an LLID of the destination ONU. In the upstream direction, the ONUs need to share channel capacity and resources, because there is only one link coupling the passive optical coupler to the OLT.

In order to avoid collision of upstream transmissions from different ONUs, ONU transmissions are arbitrated. This arbitration can be achieved by allocating a transmission window (grant) to each ONU. An ONU defers transmission until its grant arrives. A multipoint control protocol (MPCP) located in the MAC control layer can be used to assign transmission time slots to ONUs, and the MPCP in an OLT is responsible for arbitrating upstream transmissions of all ONUs coupled to the same OLT.

Due to the splitting loss at passive optical splitter 108, the number of ONUs coupled to an OLT is limited, thus limiting the number of subscribers within a PON. In order to increase the number of subscribers, the carrier needs to install more OLTs in the central office. Because OLTs are expensive, it is desirable to find an alternative that can allow more subscribers to couple to one OLT.

SUMMARY

One embodiment of the present invention provides an optical line terminal (OLT) in an Ethernet passive optical network (EPON). The OLT includes a number of bi-direction optical transceivers. At least one bi-direction optical transceiver is coupled to an optical network unit (ONU) group that includes a number of ONUs. The OLT further includes a first downstream media access control (MAC) interface configured to provide a first downstream control signal and a splitter configured to split the first downstream control signal to a number of sub-signals. At least one sub-signal is configured to control downstream transmission of a corresponding bi-direction optical transceiver to a corresponding ONU-group.

In a variation on this embodiment, the OLT further includes a number of individual upstream MAC interfaces, and at least one individual upstream MAC interface is configured to communicate with a corresponding ONU-group.

In a further variation, the individual upstream MAC interface is configured to arbitrate upstream transmissions from the ONUs belonging to a corresponding ONU-group.

In a further variation, different individual upstream MAC interfaces separately arbitrate upstream transmissions from different ONU-groups, thereby facilitating concurrent upstream transmission to the OLT from ONUs belonging to the different ONU-groups.

In a further variation, the individual upstream MAC interfaces are configured to allocate discovery slots to respective ONU-groups, wherein the discovery slots for different ONU-groups are aligned in time.

In a further variation, the downstream transmission and the upstream transmissions are carried on two different wavelengths.

In a further variation, the first downstream MAC interface and at least one individual upstream MAC interface are configured to operate at two different data rates.

In a further variation, the first downstream MAC interface and at least one individual upstream MAC interface are configured to operate at a same data rate.

In a further variation, the OLT further includes a shared upstream MAC interface configured to interface with more than one of the ONU groups.

In a further variation, the OLT further includes a merger configured to merge upstream transmissions from the more than one ONU-groups, and to send the merged transmissions to the shared upstream MAC interface.

In a further variation, upstream transmissions to a respective individual upstream MAC interface and the shared upstream MAC interface are carried on two different wavelengths over a single strand of fiber.

In a variation on this embodiment, the OLT further includes an optical transmitter and a second downstream MAC interface, wherein the second downstream MAC is configured to control downstream transmission of the optical transmitter to an ONU-group.

In a further variation, downstream transmissions from the bi-direction optical transceiver and the optical transmitter are coupled to a single strand of fiber via a wavelength division multiplexing (WDM) coupler.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Figure 2:
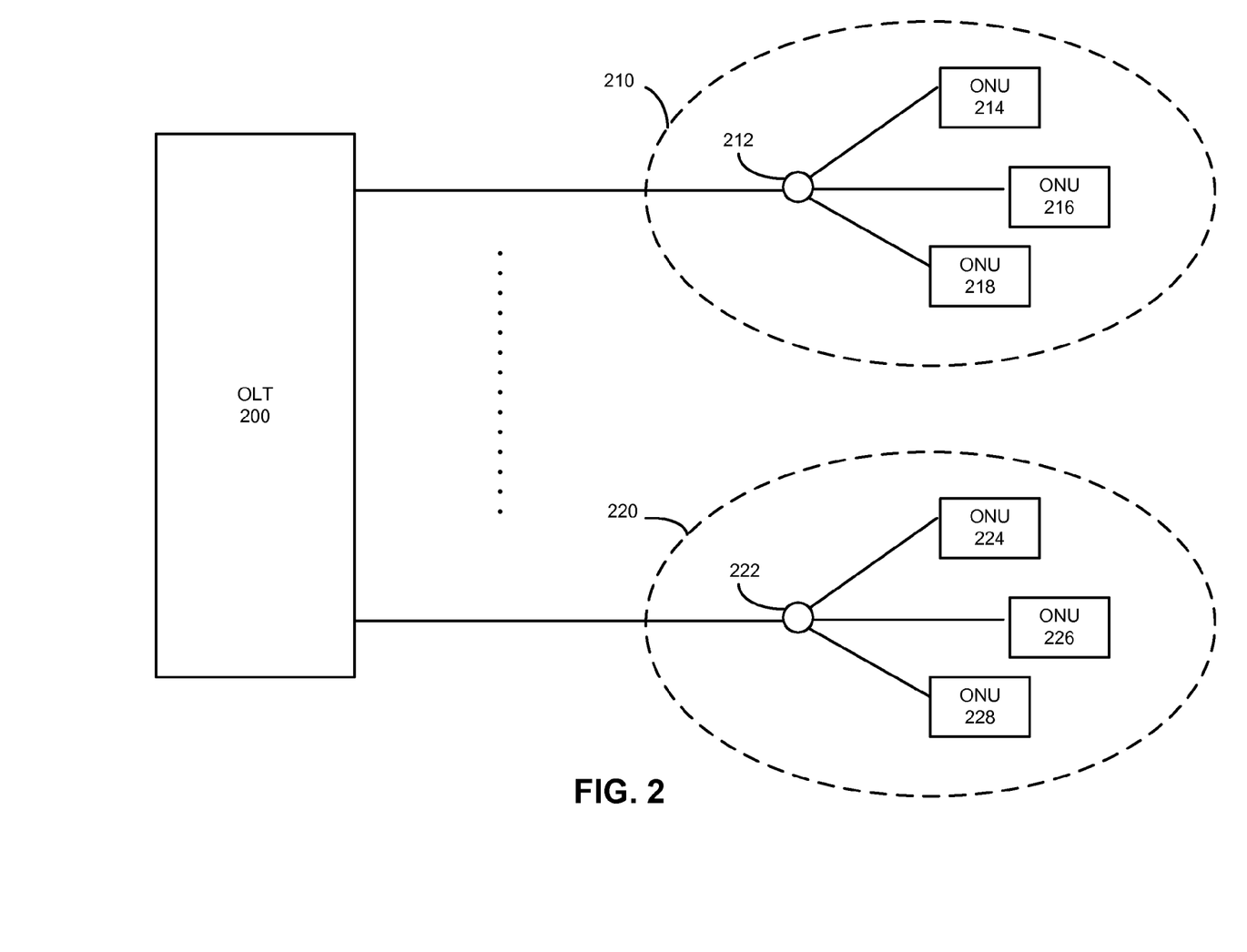
FIG. 2 presents a block diagram illustrating an OLT that supports multiple ONU-groups in accordance with an embodiment of the present invention.

FIG. 2 presents a block diagram illustrating an OLT that supports multiple groups of ONUs in accordance with one embodiment of the present invention. As shown in FIG. 2, an OLT couples to a number of ONU-groups including an ONU-group 210 and an ONU-group 220. ONU-group 210 includes ONUs 214-218, all coupled to OLT 200 via a passive optical splitter 212, and ONU-group 220 includes ONUs 224-228, all coupled to OLT 200 via a passive optical splitter 222. Using the architecture shown in FIG. 2, the number of ONUs coupled to an OLT can increase dramatically. For example, a conventional OLT may be able to couple to 32 ONUs via a passive optical splitter. With this configuration that includes eight separate ONU-groups, the number of ONUs coupled to the OLT can reach 32×8 (256). To distinguish one ONU from another, each ONU is assigned one or more LLIDs, which are unique across all ONUs coupled to OLT 200.

Similar to a conventional EPON, the downstream traffic is broadcast from OLT 200 to all ONU-groups including ONU-groups 210 and 220. In other words, all ONU-groups share the same downstream link. However, each ONU-group has its own upstream link, and the upstream traffic from ONUs of each ONU-groups is arbitrated separately by its own upstream MAC implementing MPCP located in OLT 200, as explained in more details in the examples shown in FIGS. 3-9. In other words, OLT 200 is able to arbitrate upstream traffic for each ONU-group separately and concurrently. As a result, it is possible for two ONUs coupled to the same OLT to have simultaneous transmission.

MPCP schedules upstream traffic from ONUs via GATE and REPORT messages. MPCP REPORT messages are used by the ONUs to tell the OLT the amount of data in its buffer to be sent to the OLT and the MPCP GATE message is used by the OLT to grant a time slot for the ONU to transmit a message. To schedule an ONU's upstream transmission, the OLT sends a GATE message specifying receiving LLID and a time slot. As a result, the ONU with the specified LLID schedules its upstream transmission during the time slot indicated by the GATE message. During a discovery process, in which OLT 200 discovers and initializes coupling ONUs, such as ONUs 214-218 and 224-228, OLT 200 broadcasts a discovery GATE message to all coupling ONUs within different ONU-groups. The discovery GATE message specifies a time interval in which OLT 200 enters the discovery mode and allows ONUs to register (this time interval is called the discovery window). To register, ONUs from different ONU-groups can respond to the discovery GATE message within the discovery window. To avoid collision, the multiple upstream MACs that are responsible for scheduling their respective upstream traffic need to synchronize their scheduling of the response to the discovery GATE.

Asymmetric EPON

Figure 3:
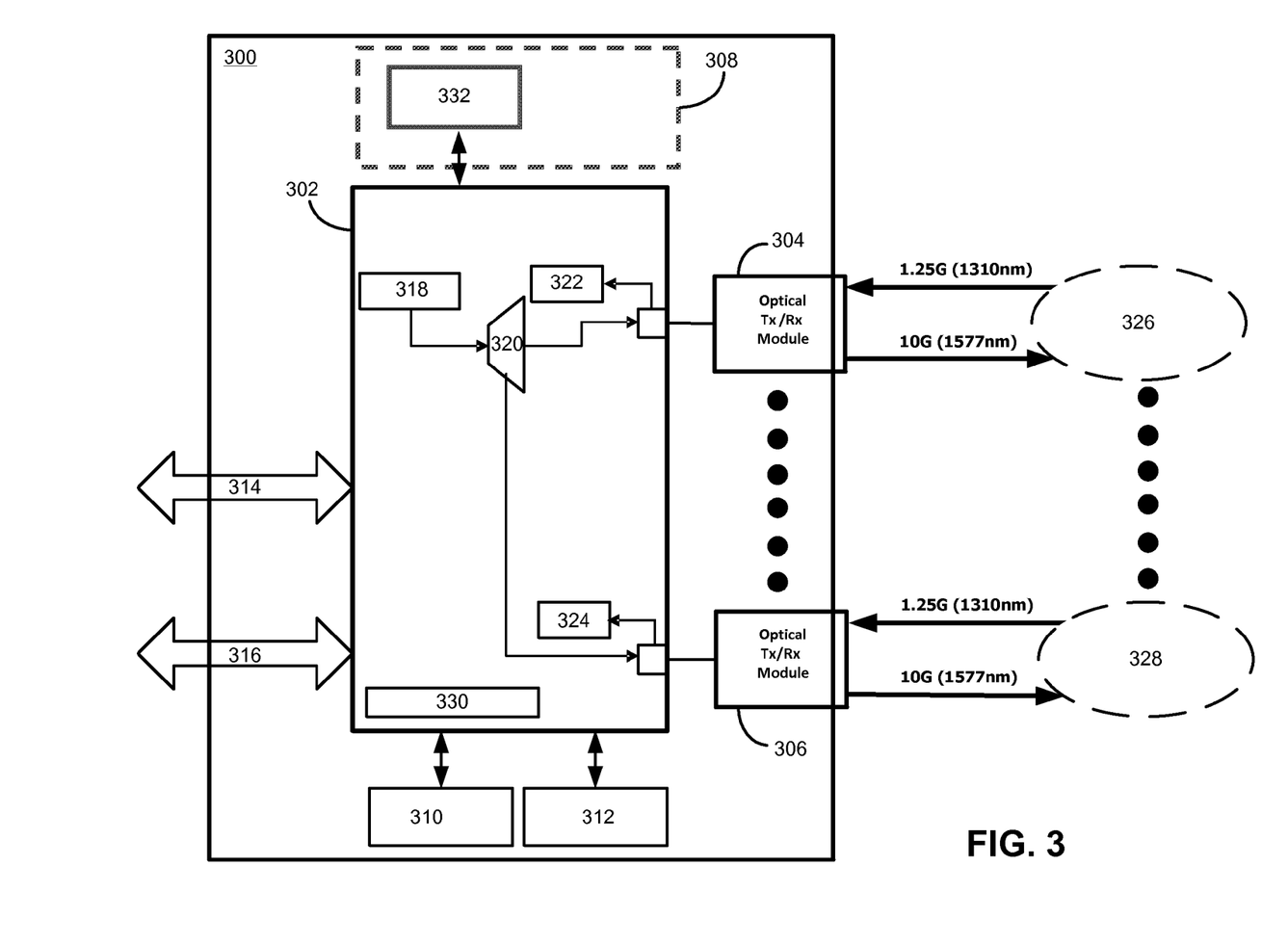
FIG. 3 presents a block diagram illustrating an exemplary configuration of an OLT line card for an asymmetric EPON system in accordance with one embodiment of the present invention.

FIG. 3 presents a block diagram illustrating an exemplary configuration of an OLT line card for an asymmetric EPON system in accordance with one embodiment of the present invention. OLT line card 300 includes a 10 Gigabit (G) EPON OLT chip 302, eight optical transceiver modules including module 304 and module 306, an optional packet buffer 308, a synchronous-dynamic random-access memory (SDRAM) 310, and a flash memory 312. Packet buffer 308 may include a number of SDRAMs, such as SDRAM 332. OLT line card 300 interfaces with a backplane via a redundant uplink interface 314, and a management interface 316. Redundant uplink interface 314 can include one or more 10 G-attachment-unit-interfaces (XAUIs), and management interface 316 can include an asynchronous bus and other Ethernet interfaces. OLT line card 300 couples to eight downstream ONU-groups, such as ONU-group 326 and ONU-group 328, each includes a number of ONUs. Each ONU-group interfaces with OLT line card 300 via an optical transceiver module. For example, ONU-group 326 interfaces with line card 300 via transceiver module 304.

OLT chip 302 includes an embedded processor 330, a 10 G downstream MAC interface 318 that controls the downstream transmission to the eight ONU-groups, and eight 1.25 G upstream MAC interfaces, such as MAC interface 322 and MAC interface 324, that control the individual upstream transmissions from the eight ONU-groups. The output of MAC interface 318 is split by a 1:8 splitter 320 into eight signals; each signal controls the transmission of an optical transceiver module, such as module 304 and module 306. In other words, all eight optical transceivers modules are transmitting the same signal downstream, thus providing a shared downstream link to all eight ONU-groups. Each of the eight optical transceiver modules has a transmitting port for 10 G downstream transmission at a wavelength of 1577 nm and a receiving port for 1.25 G upstream receiving at a wavelength of 1310 nm. Because the downstream transmission and the upstream transmission have different data rates, the EPON system is said to be asymmetric. Also note that the downstream and the upstream signals are carried at different wavelengths; thus, a single strand of fiber can be used to carry signals to and from an ONU-group. The upstream receiving of the eight optical transceiver modules are independently controlled by eight upstream MAC interfaces, such as MAC interface 322 and MAC interface 324, all working at a speed of 1.25 G. Each upstream MAC interface is configured to arbitrate upstream transmissions from ONUs within an ONU group. As a result, OLT line card 300 can arbitrate upstream traffic for each ONU group separately and concurrently.

Figure 4:
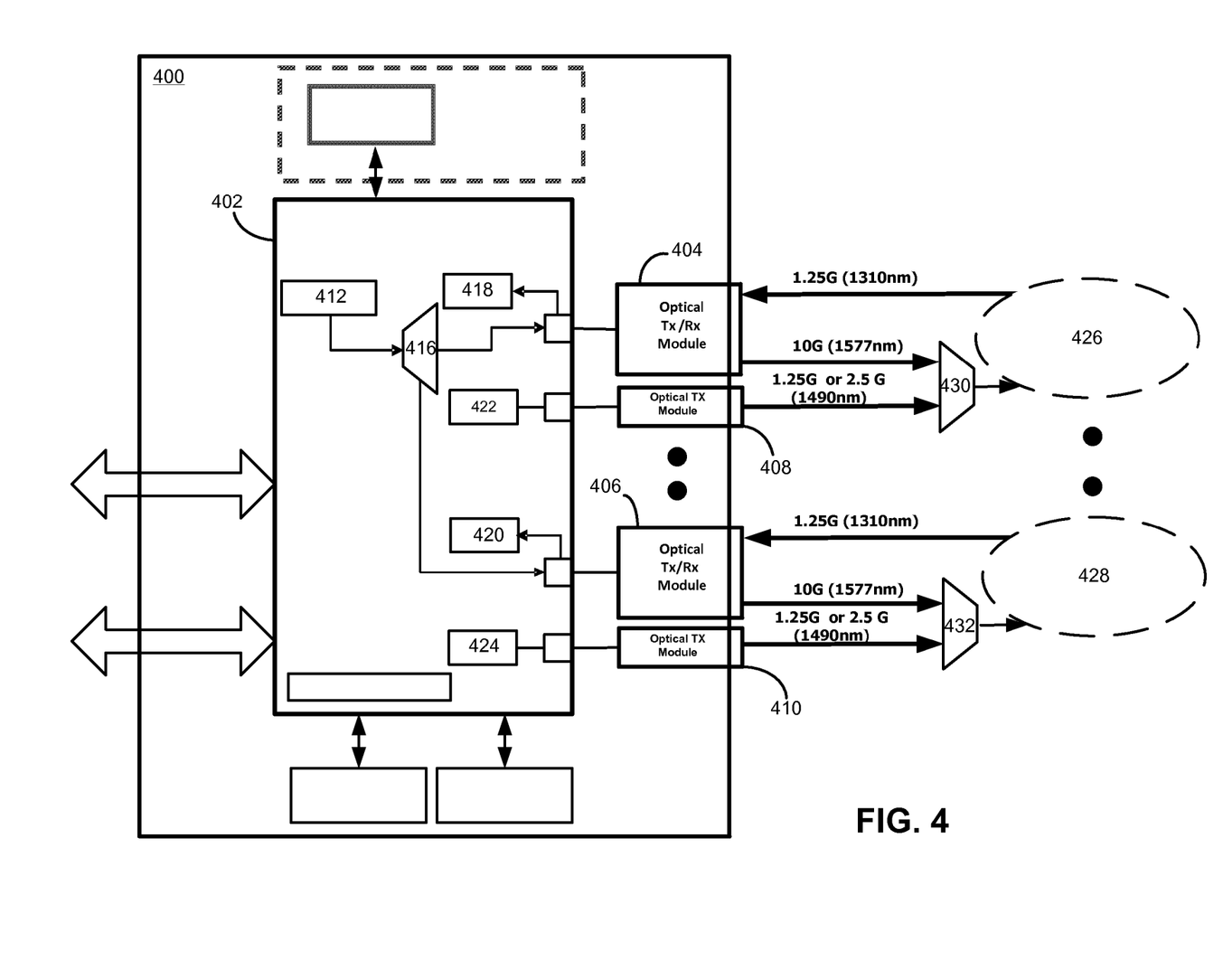
FIG. 4 presents a block diagram illustrating an exemplary configuration of an OLT line card for an asymmetric EPON system in accordance with one embodiment of the present invention.

In addition to the OLT architecture shown in FIG. 3, other asymmetrical variations are also possible. For example, in addition to a shared downstream link, it is also possible for an OLT to provide a dedicated downstream link to each ONU-group. FIG. 4 presents a block diagram illustrating an exemplary configuration of an OLT line card for an asymmetric EPON system in accordance with one embodiment of the present invention. In FIG. 4, OLT line card 400 includes an OLT chip 402, and is coupled to four individual ONU groups including ONU-group 426 and ONU-group 428. In addition to an optical transceiver module, each ONU-group is also coupled to an optical transmitter module. For example, ONU-group 426 is coupled to an optical transceiver module 404 and an optical transmitter module 408, and ONU-group 428 is coupled to an optical transceiver module 406 and an optical transmitter module 410. As a result, in addition to a shared 10 G downstream link, OLT line card 400 also provides each ONU-group with its own dedicated downstream link. Similar to the one shown in FIG. 3, the shared 10 G downstream link is controlled by a common 10 G downstream MAC interface 412, whose output is sent to a 1:4 splitter 416 and is split into four signals, each controlling the downstream transmission of an optical transceiver module. Optical transmitter modules, such as modules 408 and 410, provide additional dedicated downstream links to individual ONU-groups. Each optical transmitter module is individually controlled by a dedicated downstream MAC interface, thus resulting in a dedicated downstream link for each ONU-group. For example, optical transmitter modules 408 and 410 are controlled separately by downstream MAC interfaces 422 and 424. Optical transmitter modules 408 and 410 can transmit at a data rate of 1.25 G or 2.5 G over a wavelength of 1490 nm. The transmission output of an optical transceiver module (10 G, 1577 nm) and the transmission output of a corresponding optical transmitter (1.25 or 2 G, 1490 nm) can be coupled to a single strand of fiber using a wavelength-division-multiplexing (WDM) coupler, such as WDM coupler 430 and 432. Providing dedicated downstream links in addition to a shared down stream link makes it possible for implementing quality of service (QOS) control. Similar to FIG. 3, the 1.25 G, 1310 nm upstream link for each ONU-group is provided by the receiving port of a corresponding optical transceiver module, which is controlled by an individual 1.25 G upstream MAC interface, such as MAC interface 418 and MAC interface 420.

Figure 5:
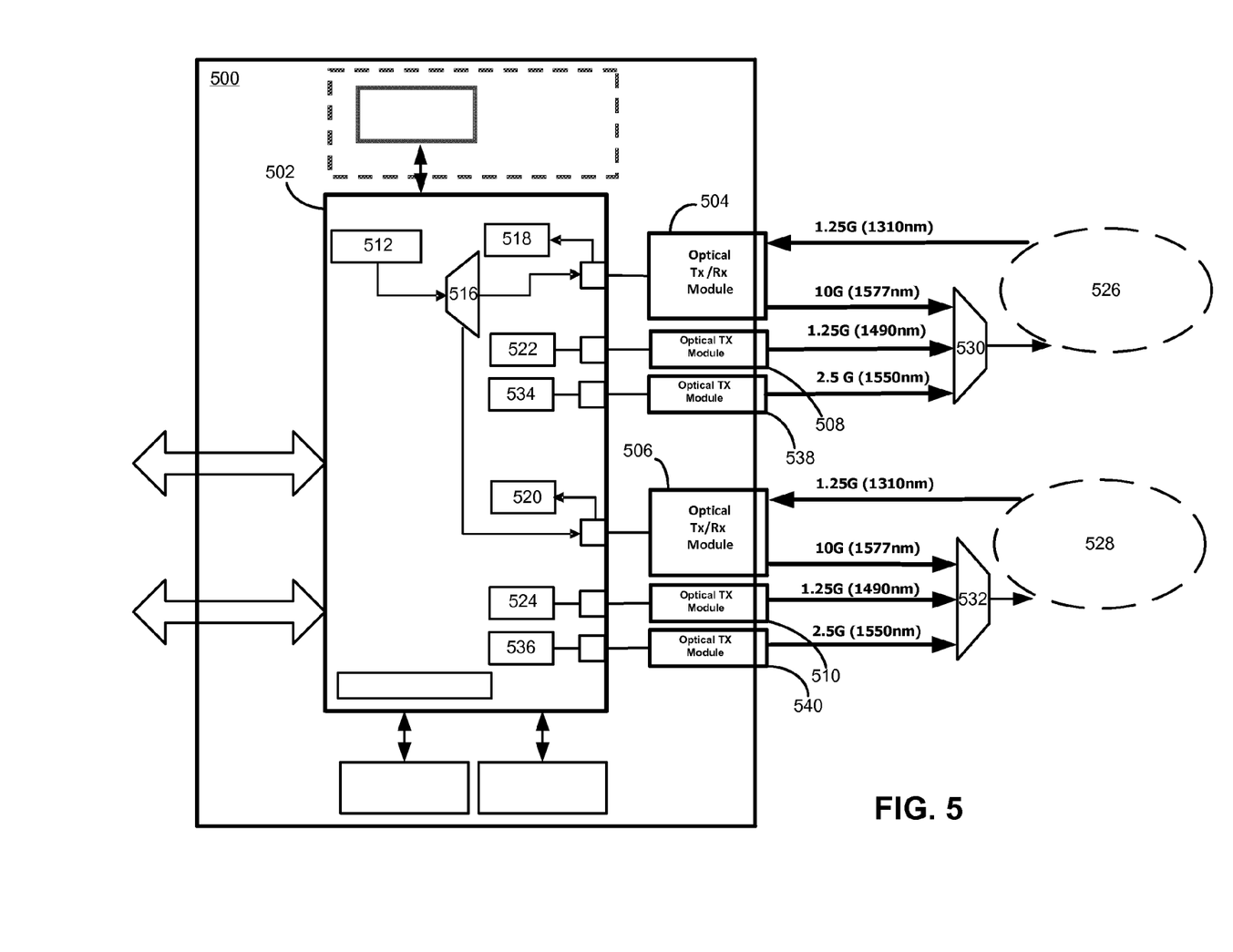
FIG. 5 presents a block diagram illustrating an exemplary configuration of an OLT line card for an asymmetric EPON system in accordance with one embodiment of the present invention.

FIG. 5 presents another exemplary configuration of a 10 G OLT line card for an asymmetric EPON system in accordance with an embodiment. In FIG. 5, OLT line card 500 is coupled to two ONU-groups 526 and 528, providing each a shared 10 G downstream link at 1577 nm, a dedicated 2.5 G downstream link at 1550 nm, and a 1.25 G dedicated downstream link at 1490 nm. Similar to FIGS. 3 and 4, the output of a common 10 G downstream MAC interface 512, which is located on an OLT chip 502, is split in two ways by a 1:2 splitter 516, and the split signals control downstream transmissions of optical transceiver modules 504 and 506, thus providing a shared 10 G downstream link to ONU-groups 526 and 528. In addition, optical transmitter modules 508 and 510, which are separately controlled by 1.25 G downstream MAC interfaces 522 and 524, provide dedicated downstream links at a wavelength of 1490 nm to ONU-groups 526 and 528, respectively. Moreover, optical transmitter modules 538 and 540, which are separately controlled by 2.5 G downstream MAC interfaces 534 and 536, provide additional dedicated downstream links at a wavelength of 1550 nm to ONU-groups 526 and 528, respectively. The three downstream transmissions at different wavelengths are multiplexed together by a WDM multiplexer, such as multiplexers 530 and 532, to a single strand of fiber before reaching the passive optical splitters for a corresponding ONU-group. Similar to FIGS. 3 and 4, the 1.25 G, 1310 nm upstream links for each ONU-group are provided by the receiving ports of optical transceiver modules 504 and 506.

Symmetric EPON

Figure 6:
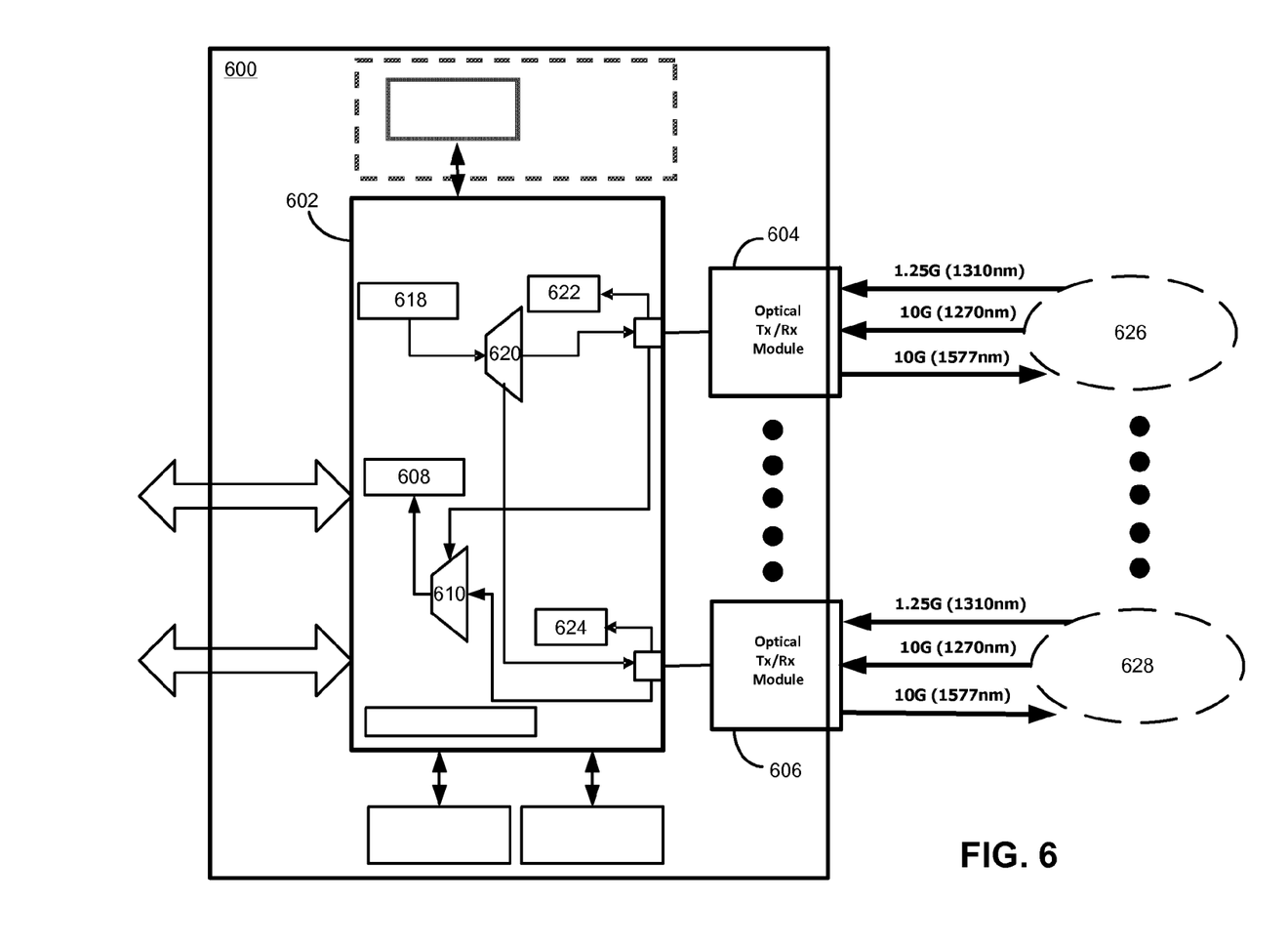
FIG. 6 presents a block diagram illustrating an exemplary configuration of an OLT line card for a symmetric EPON system in accordance with one embodiment of the present invention.

In addition to asymmetric EPON solutions, embodiments of the present invention also include symmetric EPON solutions, where the downstream and upstream transmissions have the same bandwidth. FIG. 6 presents a block 10 diagram illustrating an exemplary configuration of an OLT line card for a symmetric EPON system in accordance with one embodiment of the present invention. Similar to FIG. 3, OLT line card 600 couples to eight ONU-groups, such as ONU-group 626 and ONU-group 628, via eight optical transceivers modules, such as transceiver modules 604 and 606. A common 10 G downstream MAC interface 618 controls the transmission of all eight transceiver modules via a 1:8 splitter 620, thus providing a shared 10 G downstream link at a wavelength of 1577 nm to all ONU-groups. In FIG. 6, the upstream transmission links from each ONU-group include a 10 G transmission link at a wavelength of 1270 nm and a 1.25 G transmission link at a wavelength of 1310 nm. Both transmissions are received by the receiving port of the corresponding transceiver module, which is capable of dual-rate receiving. For example, the receiving port of transceiver module 604 receives the two upstream transmissions from ONU-group 626. To avoid collisions of the two upstream transmissions, each transmission is assigned a time-division-multiple-access (TDMA) time slot. Similar to OLT chip 302 shown in FIG. 3, OLT chip 602 includes a group of 1.25 G upstream MAC interfaces, such as upstream MAC interfaces 622 and 624, each controls and processes a 1.25G, 1310 nm signal received from each individual ONU-group, thus providing a dedicated upstream link to each ONU-group. Such dedicated upstream link allows 1.25 G, 1310nm upstream traffic from each ONU-group to be scheduled separately and concurrently. As a result, it is possible to for two ONUs coupled to OLT line card 600 to have simultaneous upstream transmission. Note that the summed bandwidth of all eight dedicated upstream links can be 10 G. In one embodiment, each dedicated upstream MAC interface, such as MAC 622 and MAC 624, has a flexible capacity of up to 10 G. Thus, it is possible for an individual ONU-group to have a 10 G upstream transmission on such a dedicated link. However, the aggregate uplink bandwidth is limited by an aggregate shaper to a sum of 10 G among all ONU-groups. Consequently, a switch behind the MACs only sees a limited bandwidth of 10 G.

On the other hand, the 10 G, 1270 nm upstream transmission from all ONU-groups are merged together by a 8:1 merger 610, and the merged signal is sent to a common 10G upstream MAC interface 608 for control and processing. As a result, in addition to dedicated upstream links, OLT line card 600 also provides a shared upstream link to all ONU-groups. The 10G upstream transmissions from all ONUs within all ONU-groups are arbitrated by the MPCP implemented in the common 10G upstream MAC interface 608.

Figure 7:
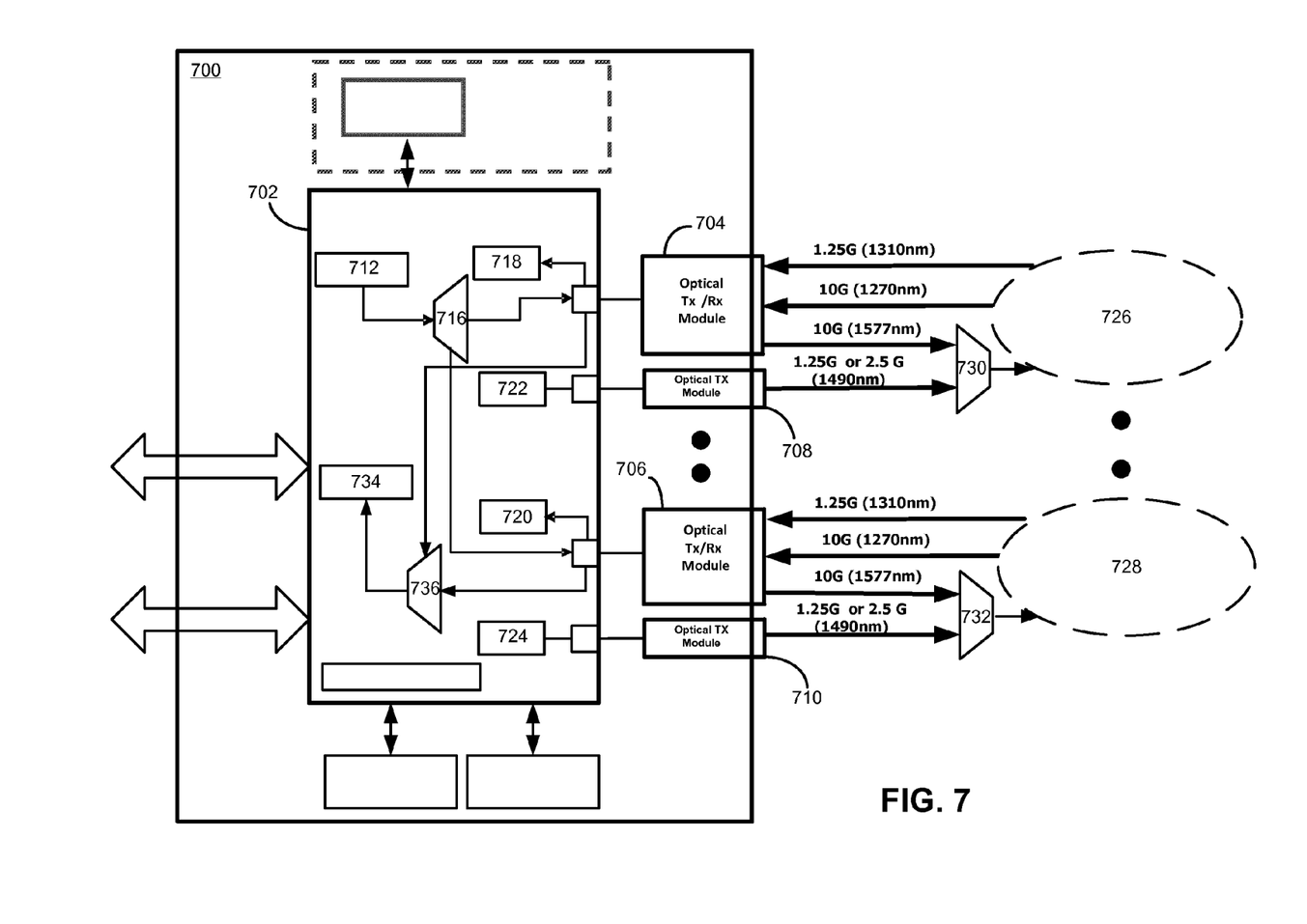
FIG. 7 presents a block diagram illustrating an exemplary configuration of an OLT line card for a symmetric EPON system in accordance with one embodiment of the present invention.

FIG. 7 presents a block diagram illustrating an exemplary configuration of an OLT line card for a symmetric EPON system in accordance with one embodiment of the present invention. In FIG. 7, the structure of OLT line card 700 is similar to that of OLT line card 400 illustrated in FIG. 4. In FIG. 7, OLT line card 700 includes an OLT chip 702 and couples to four ONU-groups including ONU-groups 726 and 728. OLT line card 700 provides a 10 G, 1577 nm shared downstream link and a 1.25 G (or 2.5 G), 1490 nm dedicated downstream link to each ONU-group. The 10 G shared downstream link is provided by a common 10 G downstream MAC interface 712, which controls the downstream transmission of optical transceiver modules, such as modules 704 and 706, via a 1:4 splitter 716. Dedicated downstream links to individual ONU-groups are provided by dedicated 1.25 G (or 2.5 G) downstream MAC interfaces, such as MAC interfaces 722 and 724, each controlling the transmission of an optical transmitter module, such as transmitter modules 708 and 710. The shared and dedicated downstream transmissions to each ONU-group are coupled to a single strand of fiber via a WDM coupler, such as coupler 730 and 732. The difference between the system shown in FIG. 7 and the one shown in FIG. 4 is that, in addition to a dedicated 1.25 G, 1310 nm upstream link, each ONU-group in FIG. 7 is also provided with a 10 G, 1270 nm shared upstream link. Both the dedicated upstream transmission and the shared upstream transmission from each ONU-group are received by the receiving port of an optical transceiver module, such as modules 704 and 706, and each upstream transmission occupies a TDMA time slot. The 10 G, 1270 nm upstream transmissions received from all four ONU-groups are merged together by a 1:4 merger 736, and the merged signal is sent to a common 10 G upstream MAC interface 734 for control and processing. As a result, common 10 G upstream MAC interface 734 arbitrates the 10 G upstream transmissions from all ONUs within all four ONU-groups.

Figure 8:
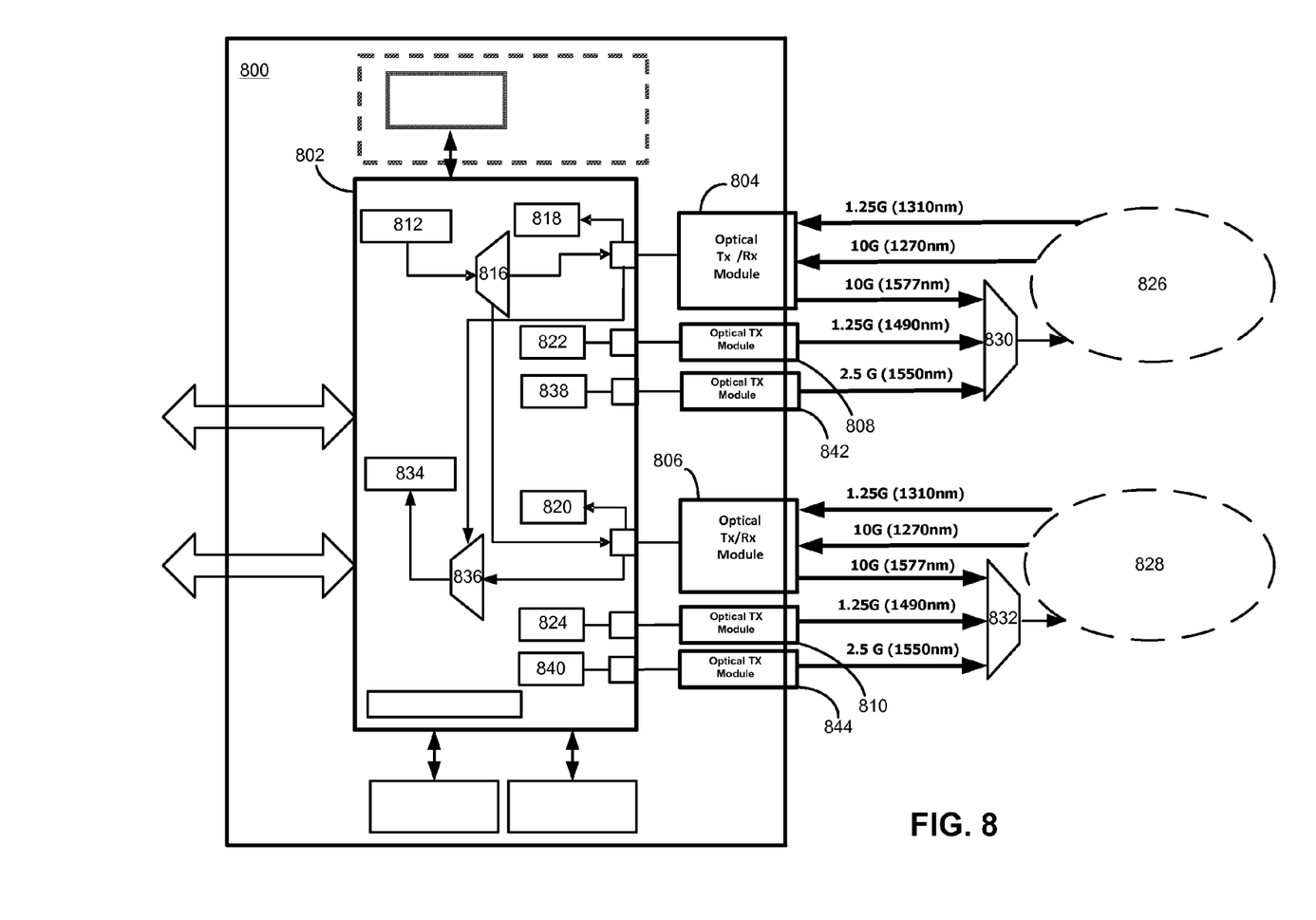
FIG. 8 presents a block diagram illustrating an exemplary configuration of an OLT line card for a symmetric EPON system in accordance with one embodiment of the present invention.

FIG. 8 presents a block diagram illustrating an exemplary configuration of an OLT line card for a symmetric EPON system in accordance with one embodiment of the present invention. In FIG. 8, the structure of OLT line card 800 is similar to that of OLT line card 500 illustrated in FIG. 5. In FIG. 8, OLT line card 800 includes an ONU chip 802 and couples to two ONU-groups 826 and 828. OLT line card 800 provides a 10 G, 1577 nm shared downstream link, a 1.25 G, 1490 nm dedicated downstream link, and a 2.5 G, 1550 nm dedicated downstream link to each ONU-group. The 10 G shared downstream link is provided by a common 10 G downstream MAC interface 812, which controls the downstream transmission of optical transceiver modules 804 and 806, via a 1:2 splitter 816. 1.25 G, 1490 nm dedicated downstream links to individual ONU-groups are provided by dedicated 1.25 G downstream MAC interfaces 822 and 824, which control the optical transmitter modules 808 and 810. 2.5 G, 1550 nm dedicated downstream links to individual ONU-groups are provided by dedicated 2.5 G downstream MAC interfaces 838 and 840, which control the optical transmitter modules 842 and 844. The shared and dedicated downstream transmissions to each ONU-group are multiplexed to a single strand of fiber via a WDM multiplexer, such as multiplexers 830 and 832. The difference between the system shown in FIG. 8 and the one shown in FIG. 5 is that, in addition to a dedicated 1.25 G, 1310 nm upstream link, each ONU-group in FIG. 8 is also provided with a 10 G, 1270 nm shared upstream link. Both the dedicated upstream transmission and the shared upstream transmission from each ONU-group are received by the receiving port of an optical transceiver module, such as modules 804 and 806, and each upstream transmission occupies a TDMA time slot. The 10 G, 1270 nm upstream transmissions received from both ONU-groups are merged together by a 1:2 merger 836, and the merged signal is sent to a common 10 G upstream MAC interface 834 for control and processing. As a result, common 10 G upstream MAC interface 834 arbitrates the 10 G upstream transmissions from all ONUs within the two ONU-groups 826 and 828.

WDM EPON

Figure 9:
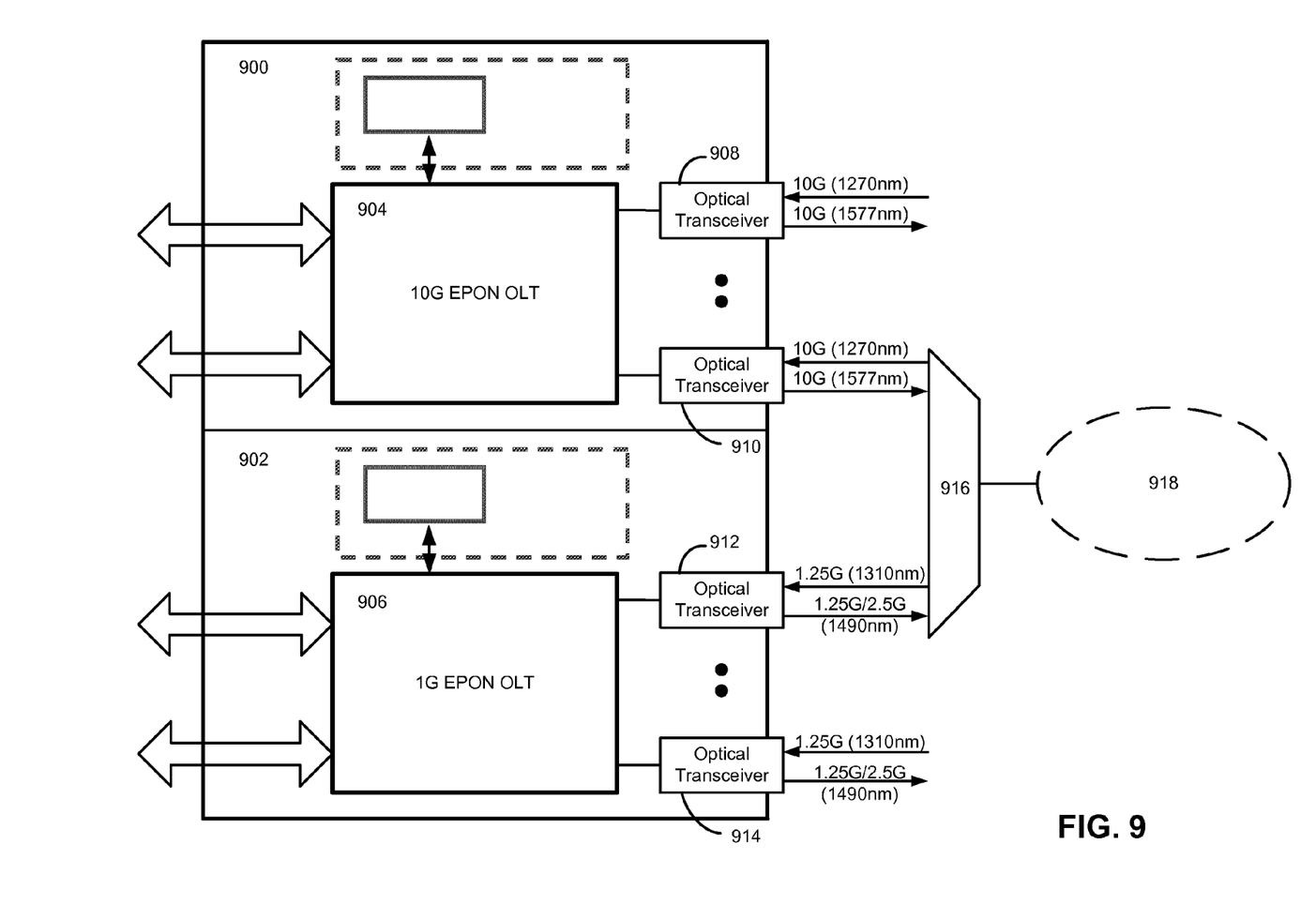
FIG. 9 presents a diagram illustrating a WDM-EPON configuration in accordance with an embodiment of the present invention

The systems illustrated in FIGS. 6-8 rely on TDMA for scheduling transmissions between the shared upstream link and the dedicated upstream link. It is also possible to utilize a WDM demultiplexer that demultiplexes the two upstream links and sends them to two separate receivers. FIG. 9 presents a diagram illustrating a WDM-EPON configuration in accordance with an embodiment of the present invention. In FIG. 9, two OLT line cards 900 and 902 are coupled to eight ONU-groups, such as ONU-group 918. OLT line cards 900 includes a 10 G EPON OLT chip 904, which is coupled to the eight ONU-groups via eight optical transceivers, such as transceivers 908 and 910. OLT line card 900 provides a 10 G, 1577 nm shared downstream link and a 10 G, 1270 nm shared upstream link to each of the eight ONU-groups. OLT line card 902 includes a 1 G EPON OLT chip 906, which is also coupled to the eight ONU-groups via eight optical transceivers, such as transceivers 912 and 914. Instead of shared links, OLT line card 902 provides each of the eight ONU-groups with a dedicated 1.25 G (or 2.5 G), 1490 nm downstream link and a dedicated 1.25 G, 1310 nm upstream link. The shared and the dedicated links are combined using a WDM multiplexer/demultiplexer. For example, a WDM multiplexer/demultiplexer 916 combines the 10 G shared downstream transmission from transceiver 910 together with the dedicated 1.25 G (or 2.5 G) downstream transmission from transceiver 912, and sends the combined signal to ONU-group 918. Similarly, multiplexer/demultiplexer 916 demultiplexes the upstream transmissions from ONU-group 918 by sending the 10 G shared upstream transmission to transceiver 910 and the 1.25 G dedicated upstream transmission to transceiver 912.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. An optical line terminal (OLT) in an Ethernet passive optical network (EPON), comprising:
   a plurality of optical transceivers, wherein an optical transceiver from among the plurality of optical transceivers is coupled to a corresponding optical network unit (ONU) group from among a plurality of ONU groups and configured to transmit a first downstream signal to the corresponding ONU group;
   a first downstream media access control (MAC) interface configured to provide a downstream control signal;
   an optical transmitter coupled to the corresponding ONU group, the optical transmitter being configured to transmit a second downstream signal to the corresponding ONU group;
   a second downstream MAC interface configured to control transmission of the second downstream signal; and
   a splitter configured to split the downstream control signal into a plurality of sub-signals, wherein a sub-signal from among the plurality of sub-signals controls the transmission of the first downstream signal.

2. The OLT of claim 1, further comprising:
   a plurality of individual upstream MAC interfaces, wherein an individual upstream MAC interface from among the plurality of individual upstream MAC interfaces is configured to communicate with the corresponding ONU group.

3. The OLT of claim 2, wherein the individual upstream MAC interface is further configured to arbitrate upstream transmissions from the plurality of ONU groups.

4. The OLT of claim 2, wherein the plurality of individual upstream MAC interfaces are configured to separately arbitrate upstream transmissions from different ONU groups to facilitate concurrent upstream transmission to the OLT.

5. The OLT of claim 2, wherein the plurality of individual upstream MAC interfaces are configured to allocate discovery slots to respective ONU groups, and wherein the discovery slots are substantially aligned in time.

6. The OLT of claim 3, wherein the downstream and upstream transmissions propagate on two different wavelengths.

7. The OLT of claim 2, wherein the first downstream MAC interface and the individual upstream MAC interface are configured to operate at different data rates.

8. The OLT of claim 2, wherein the first downstream MAC interface and the individual upstream MAC interface are configured to operate at an identical data rate.

9. The OLT of claim 2, further comprising:
   a shared upstream MAC interface configured to interface with the plurality of ONU groups.

10. The OLT of claim 9, farther comprising:
    a merger configured to:
       merge upstream transmissions from the plurality of ONU groups into a merged transmission; and
       send the merged transmission to the shared upstream MAC interface.

11. The OLT of claim 9, wherein upstream transmissions to the individual upstream MAC interface and to the shared upstream MAC interface propagate on different wavelengths.

12. The OLT of claim 1, wherein the first downstream signal and the second downstream signal are coupled to an optical fiber via a wavelength division multiplexing (WDM) coupler.

13. An optical line terminal (OLT) in an Ethernet passive optical network (EPON), comprising:
   a plurality of optical transceivers configured to transmit a first downstream signal to a corresponding optical networking unit (ONU) group from among a plurality of ONU groups; and
   a plurality of optical transmitters configured to transmit a second downstream signal to the corresponding ONU group,
   wherein the plurality of optical transceivers are further configured to be controlled by a common media access control (MAC) interface, and wherein the plurality of optical transmitters are further configured to be controlled by a plurality of MAC interfaces.

14. The OLT of claim 13, wherein each of the plurality of optical transmitters are further configured to be dedicated to a separate ONU group from among the plurality of ONU groups.

15. The OLT of claim 13, wherein the plurality of optical transceivers are further configured to transmit identical downstream signals as a single downstream link shared among the plurality of ONU groups.

16. The OLT of claim 13, further comprising:
a plurality of upstream MAC interfaces configured to arbitrate concurrent upstream transmissions from the plurality of ONU groups.

17. The OLT of claim 16, wherein the downstream signal and the concurrent upstream transmissions propagate on different wavelengths.

18. The OLT of claim 13, wherein the common MAC interface and the plurality of MAC interfaces are configured to operate at an identical data rate.

19. The OLT of claim 13, wherein the common MAC interface and the plurality of MAC interfaces are configured to operate at different data rates.

20. An optical line terminal (OLT) in an Ethernet passive optical network (EPON), comprising:
a plurality of optical transceivers configured to receive a first and a second upstream signal from a corresponding optical networking unit (ONU) group from among a plurality of ONU groups;
a merger configured to receive and merge first upstream signals received by the plurality of optical transceivers into a merged upstream transmission;
a common media access control (MAC) interface configured to arbitrate the first upstream signals within the merged upstream transmission; and
a plurality of MAC interfaces configured to process second upstream signals received by the plurality of optical transceivers.

21. The OLT of claim 20, further comprising:
a plurality of optical transmitters, wherein each optical transmitter from among the plurality of optical transmitters is configured to be dedicated to separate ONU groups from among the plurality of ONU groups.

22. The OLT of claim 20, wherein the plurality of optical transceivers are further configured to transmit identical downstream signals on a downstream link shared among the plurality of ONU groups.

23. The OLT of claim 20, wherein the plurality of MAC interfaces are further configured to arbitrate concurrent upstream transmissions received from the plurality of ONU groups.

24. The OLT of claim 23, wherein downstream signals and the concurrent upstream transmissions propagate on different wavelengths.

25. The OLT of claim 20, wherein the common MAC interface and the plurality of MAC interfaces are configured to operate at an identical data rate.

26. The OLT of claim 20, wherein the common MAC interface and the plurality of MAC interfaces are configured to operate at different data rates.

* * * * *